United States Patent
Haeussler et al.

(10) Patent No.: US 6,243,639 B1
(45) Date of Patent: Jun. 5, 2001

(54) METHOD AND DEVICE FOR MODELING A HYDRAULIC SYSTEM

(75) Inventors: Alexander Haeussler, Heidelberg; Helmut Wiss, Moeglingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/326,224

(22) Filed: Jun. 4, 1999

(30) Foreign Application Priority Data

Jun. 5, 1998 (DE) ............................................. 198 25 113

(51) Int. Cl.$^7$ ....................................................... B60T 8/58
(52) U.S. Cl. ......................... 701/70; 303/15; 303/116.1; 303/113.3; 303/113.2; 303/119.1; 303/113.5; 303/125
(58) Field of Search ....................... 701/70, 71; 303/125, 303/189, 11

(56) References Cited

U.S. PATENT DOCUMENTS

| | | | |
|---|---|---|---|
| 4,919,493 | * | 4/1990 | Leiber ..................................... 303/15 |
| 5,364,176 | * | 11/1994 | Sawada et al. .................... 303/113.2 |
| 5,492,394 | * | 2/1996 | Kusano et al. ..................... 303/113.2 |
| 5,496,101 | * | 3/1996 | Kurokawa ............................. 303/125 |
| 5,711,582 | * | 1/1998 | Koike ...................................... 303/11 |
| 5,722,744 | * | 3/1998 | Kupfer et al. ......................... 303/189 |
| 5,887,954 | * | 3/1999 | Stiner et al. ....................... 303/113.4 |
| 5,941,608 | * | 8/1999 | Campau et al. ................... 303/113.4 |

* cited by examiner

Primary Examiner—William A. Cuchlinski, Jr.
Assistant Examiner—Tuan C To
(74) Attorney, Agent, or Firm—Kenyon & Kenyon

(57) ABSTRACT

A method and device for estimating pressure changes within a hydraulic system having a first reservoir and at least one second reservoir connected to the first reservoir via valves, including the following steps:

(a) specifying a pressure differential between the first and second reservoirs;

(b) calculating a volume exchanged within a specified time interval between the first and second reservoirs via the valve, on the basis of a value for the pressure differential that is valid at the start of the time interval;

(c) calculating a volume to be exchanged between the two reservoirs to achieve equal pressures in them;

(d) if the amount of the exchanged volume calculated in step (b) is greater than the volume to be exchanged as calculated in step (c), replacing the value of the exchanged volume with that of the volume to be exchanged; and (e) adopting the volume value obtained in step (d) as the change in the volume in the second reservoir and determining the pressure change in the reservoirs on the basis of the volume value obtained in step (d).

9 Claims, 4 Drawing Sheets

METHOD AND DEVICE FOR MODELING A HYDRAULIC SYSTEM

FIELD OF THE INVENTION

The present invention relates to a method and/or a device for modeling a hydraulic system containing at least two reservoirs connected via a valve, or in other words, for estimating changes in pressure and/or volume within this system in response to external changes.

BACKGROUND INFORMATION

Modeling methods are used in particular in antilock control systems for motor vehicles. Such systems are known, for example, from German Patent No. 43 40 921, German Patent No. 40 12 167, or German Patent No. 40 30 724.

The braking system of a motor vehicle constitutes a hydraulic system having a master brake cylinder, brake chambers within the motor vehicle wheels, and a brake circuit connecting the master brake cylinder to the brake chambers. These components may be viewed as a plurality of reservoirs, each reservoir being fully characterized for modeling purposes by its volume, its pressure and its connections to the other reservoirs. The antilock system is a cyclically operating electronic circuit which, using a plurality of sensors, senses the pressure in the master brake cylinder and the movement characteristics of the wheels, and by actuating inlet valves arranged between the master brake cylinder and the wheel brake chambers, attempts to establish a braking pressure that permits desired wheel-movement characteristics, such as rotational speed or slip, to be achieved as precisely as possible. In order to do this, it is necessary to be able to estimate the pressure that will arise in the wheel brake chambers if the latter are connected, via the (temporary) opening of a valve, to a part of the brake circuit that is at a higher or lower pressure than the one prevailing in the wheel brake chamber before the valve is opened. Here the cyclic manner of operation of the control circuit poses the problem that only at certain time intervals can the control circuit acquire new values for the parameters it is to take into account.

The closed-loop control exercised by the circuit must remain oriented to these parameter values until new ones are available, but in fact the values of these parameters change continuously between two detection instants. The result is systematic errors in control.

If one considers two reservoirs inter-connected via a valve (see FIG. 1), the volumetric flow rate q from the higher-pressure to the lower-pressure reservoir, according to Bernoulli, is given by:

$$q = \alpha * A (2/\rho)^{1/2} * \Delta P^{1/2}$$

where $\alpha$ is the orifice coefficient and A is the geometric cross sectional area of the valve, $\rho$ is the density of the fluid and $\Delta P$ is the pressure differential across the valve. If one employs this formula, or a corresponding one, to model the hydraulic system, the problem arises that only the parameter values acquired at the earlier time are available between two detection instants, whereas in the real system, the volumetric flow rate between the two detection times causes the pressure differential to even out, in turn reducing the volumetric flow rate q. Hence, too high a volumetric flow rate is always calculated in the modeling process. This causes the model to oscillate continually, restricting its utility for pressure regulation.

SUMMARY OF THE INVENTION

An object of the present invention is to provide a method and/or a device for estimating changes in pressure and/or volume within a hydraulic system, so as to preclude these continual oscillations.

DETAILED DESCRIPTION

Figure 4:
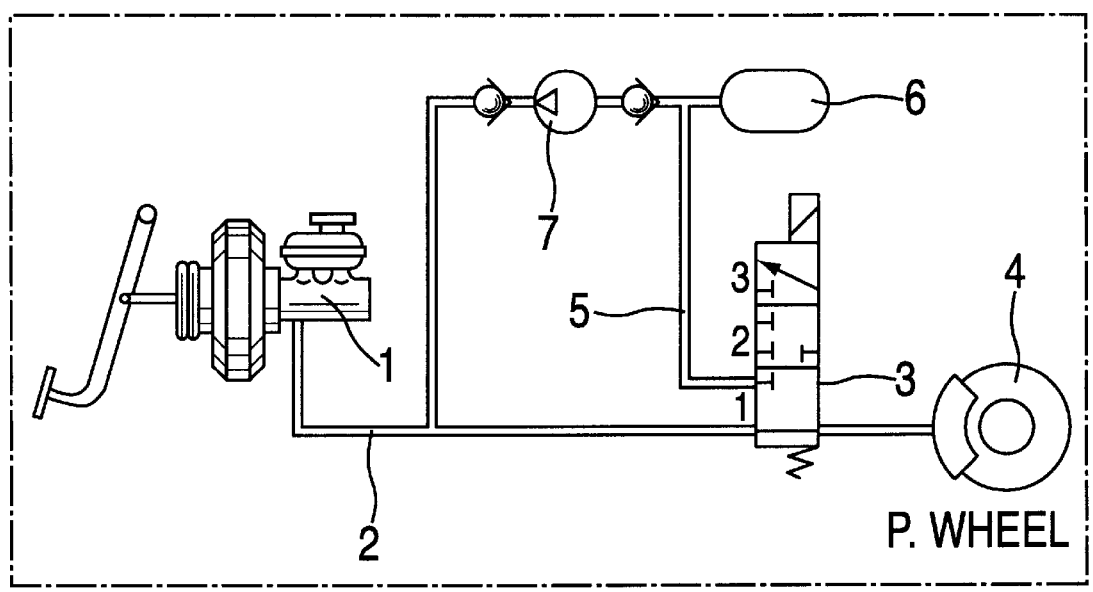
FIG. 4 shows a schematic diagram of a known motor vehicle braking system.

The motor vehicle braking system shown in FIG. 4 is known and will, therefore, be explained here only insofar as is necessary for an understanding of how the method in accordance with the present invention is applied in such a system.

The motor vehicle braking system includes a master brake cylinder 1, which is connected via a high-pressure line 2 to a three-position valve 3. In position (1), three-position valve 3 connects high-pressure line 2 to brake chamber 4 of a wheel in such a way that brake fluid can flow into the wheel chamber and develop a braking pressure. In a second position (2) of the three-position valve, brake chamber 4 is disconnected from high-pressure line 2. In a third position (3), the chamber is connected to a low-pressure line 5 via which brake fluid can flow out to a storage chamber 6 and a feed pump 7. The feed pump delivers brake fluid into high-pressure line 2 and thus maintains an elevated pressure there. Other valves and wheel brake chambers (not shown) are connected parallel to valve 3 and wheel brake chamber 4.

Figure 1:
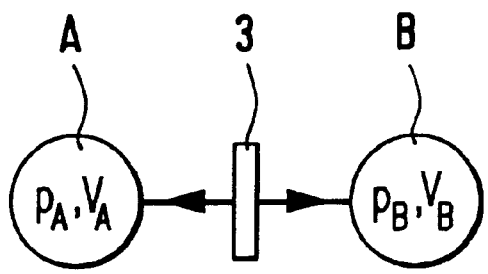
FIG. 1 shows a schematic diagram of a hydraulic system.

FIG. 1, in highly schematized form, shows a hydraulic system having two reservoirs A, B, which have volumes $V_A$, $V_B$, that are separated by a valve 3 and may be at different pressures $p_A$, $p_B$. This system may of course in its turn be part of a larger system. In the preferred application of the method within the framework of a pressure regulation system for a motor vehicle, the first reservoir A is a part of the braking circuit of the motor vehicle, such as high-pressure line 2 or low-pressure line 5 having storage chamber 6. The second reservoir B may be the brake chamber of an individual wheel of the motor vehicle.

For each reservoir A, B and for the entire system A+B, there exists a pV characteristic $f_A$, $f_B$, or $f_{A+B}$, respectively, which may be used to find the volume $V_i = f_i(V_i)$ (I=A, B, A+B) associated with the pressure in the reservoir, where $f_{A+B}$ is the sum of $f_A$ and $f_B$. For the system pressure in a state of equilibrium with the valve open, the following applies:

$$p_{system} = p_A = p_B = f_{A+B}(V_A + V_B).$$

Figure 2:
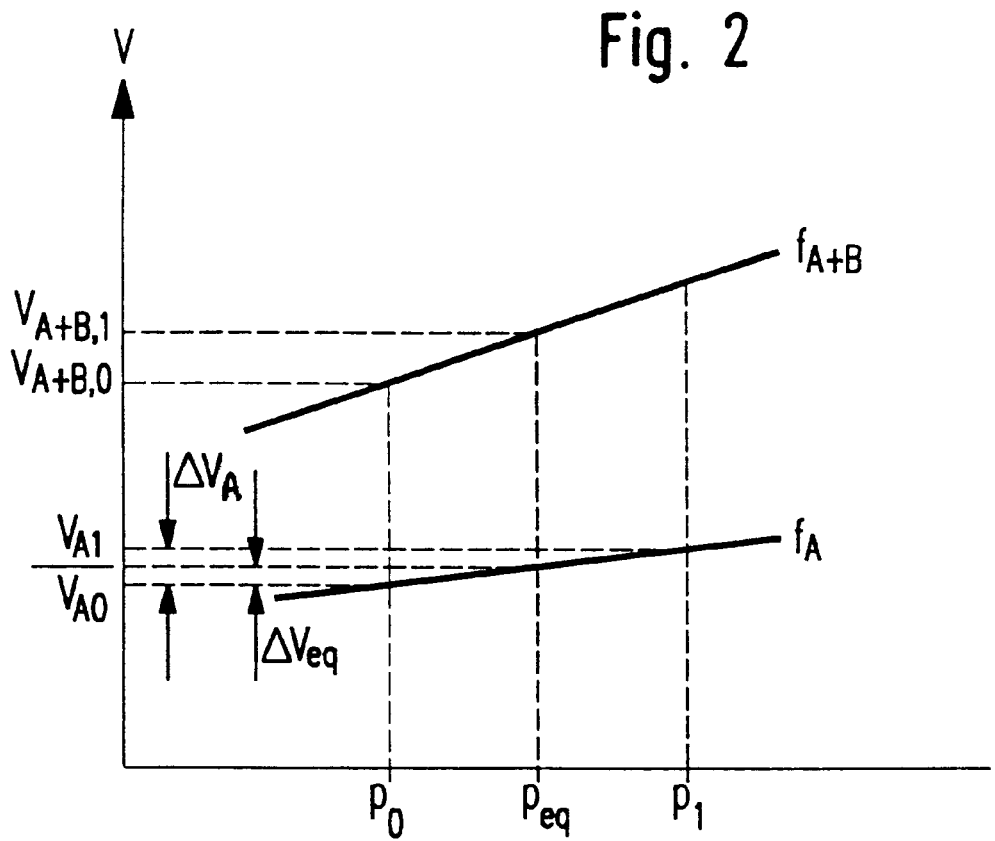
FIG. 2 shows the pressure-volume characteristics for the first reservoir and for the complete system from FIG. 1.
Figure 3:
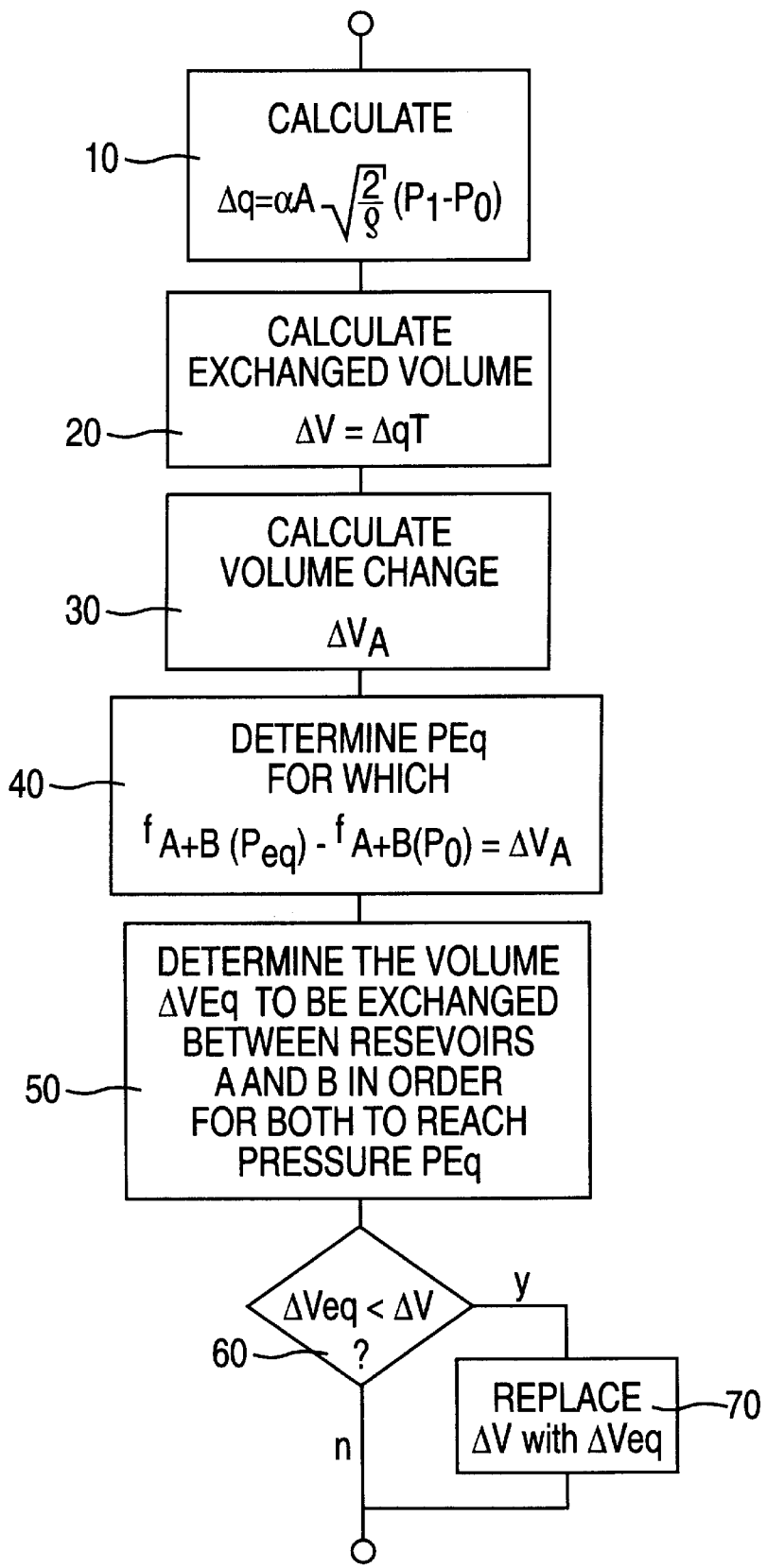
FIG. 3 shows a flow chart for a method according to the present invention.

To explain the method according to the present invention with reference to FIGS. 2 and 3, let it first be assumed that the hydraulic system is in equilibrium at pressure $p_0$. Due to an external influence, such as the starting of the feed pump, the pressure within reservoir A rises from $p_0$ to $p_1$. From the characteristic $f_A(p)$ in FIG. 2 one can see that corresponding to this change in pressure is a change in the volume of the first reservoir by $\Delta V_A$, from $V_{A0}$ to $V_{A1}$. Consequently $\Delta V_A$ is also the change in volume in the system as a whole. From the characteristic $f_{A+B}$ of the system as a whole, it can be seen that this change in volume is equivalent only to a pressure increase to the value $p_{eq}$, which lies between $p_0$ and $p_1$. This is the equilibrium pressure that would establish itself in the system over the long term with valve 2 open. To achieve this value, the volume $\Delta V_{eq}$ must be displaced from reservoir A to reservoir B.

FIG. 3 illustrates the sequence of the method according to the present invention, using a flow chart. The method may be executed by a conventional microprocessor control unit which is known and need not be described in more detail here. A memory in the control unit contains a first table and a second table, respectively, listing the volume in the first and second reservoirs as a function of the pressure prevailing in those reservoirs, as well as a third table from which the pressure of the hydraulic system in equilibrium may be found as a function of its volume.

It is assumed that the system is in equilibrium at pressure $p_0$ at the beginning of a control procedure. Due to an external control action, such as the startup of the feed pump, the pressure in the first reservoir, high-pressure line 2, rises to $p_1$. The pressure in the second reservoir initially remains at value $p_0$. In step 10, the microprocessor initially calculates the volumetric flow rate $\Delta q$ from the first reservoir to the second one, according to the aforementioned Bernoulli formula, for a pressure differential $\Delta p=p_1-p_0$. An estimation of the volume $\Delta V$ exchanged between the two reservoirs within one working cycle of the microprocessor is obtained in step 20, by multiplying the volumetric flow rate $\Delta q$ by the duration T of the cycle, or the duration for which valve 3 is left open during the cycle, if the latter duration is less than the cycle duration. As explained above, the exchanged volume calculated in this way is systematically too great.

In step 30, the microprocessor therefore uses the first table to determine the volume $V_{A0}=f_A(P_0)$ of the first reservoir before the pressure change occurs, as well as the volume $V_{A1}=f_A(P_1)$ of the first reservoir corresponding to the modified pressure $p_1$, and determines the difference $\Delta V_A$ between the two. Since at the beginning of the control procedure, the pressure in the second reservoir, and thus its volume, has not yet changed, the change in volume of the system as a whole is given by $\Delta V_A$. The microprocessor determines the equilibrium pressure $P_{eq}$ for the total volume thus modified, by looking it up in the third table (step 40). The first table, in turn, is used to determine what volume $V_{Aeq}$ in the first reservoir corresponds to this pressure. The difference $\Delta V_{eq}=V_{A1}-V_{Aeq}$ yields the volume to be exchanged between the reservoirs in order to achieve a new pressure equilibrium. It is an upper limit, which in fact cannot be exceeded.

Hence, in step 60, the microprocessor compares value $\Delta V$ with this difference, and if the latter proves to be less, it replaces $\Delta V$ (step 70) and is used as an estimated value for the volume change in this work cycle. In this case, the hydraulic system has again achieved equilibrium at the end of the cycle.

If, in step 60, $\Delta V$ turns out to be less than this difference, the procedure is terminated for the current work cycle, but the hydraulic system is not yet back in equilibrium, and the procedure must be repeated for the subsequent work cycle. The pressure values $P_1$ in the first reservoir and $p_0$ in the second reservoir, used in this cycle, are obtained from the values in the previous work cycle by subtracting or adding the exchanged volume $\Delta V$, as applicable, and determining what pressures in the two reservoirs correspond to the resulting volume values, on the basis of the relationships $f_A$, $f_B$. These are temporarily saved in table form in a memory that can be accessed by the microprocessor. Alternatively, they may be implemented as subprograms to be run by the processor and making it possible to calculate the pressure in a reservoir as a function of its volume, or the volume as a function of pressure.

The method is applicable to systems having a plurality of second reservoirs, connected to the first reservoir via valves.

If, for example, n identical second reservoirs having identical valves are present, and the initial pressures in all second reservoirs are the same, these second reservoirs may be treated as a single reservoir having an n-fold volume, and a single valve having an n-fold cross section.

If the second reservoirs, valves and/or initial pressures differ, the procedural steps shown in FIG. 3 may be executed in each cycle for each of these second reservoirs without taking the others into account. Before the start of a subsequent cycle, the pressure $p_1$ in the first reservoir is calculated, taking account of all volumetric rates of flow into the second reservoirs.

The method may be repeated over a plurality of cycles, until a new state of equilibrium has been achieved or new measured values or estimated values for pressure and/or volume are available, against which the model can be recalibrated.

Figure 5:
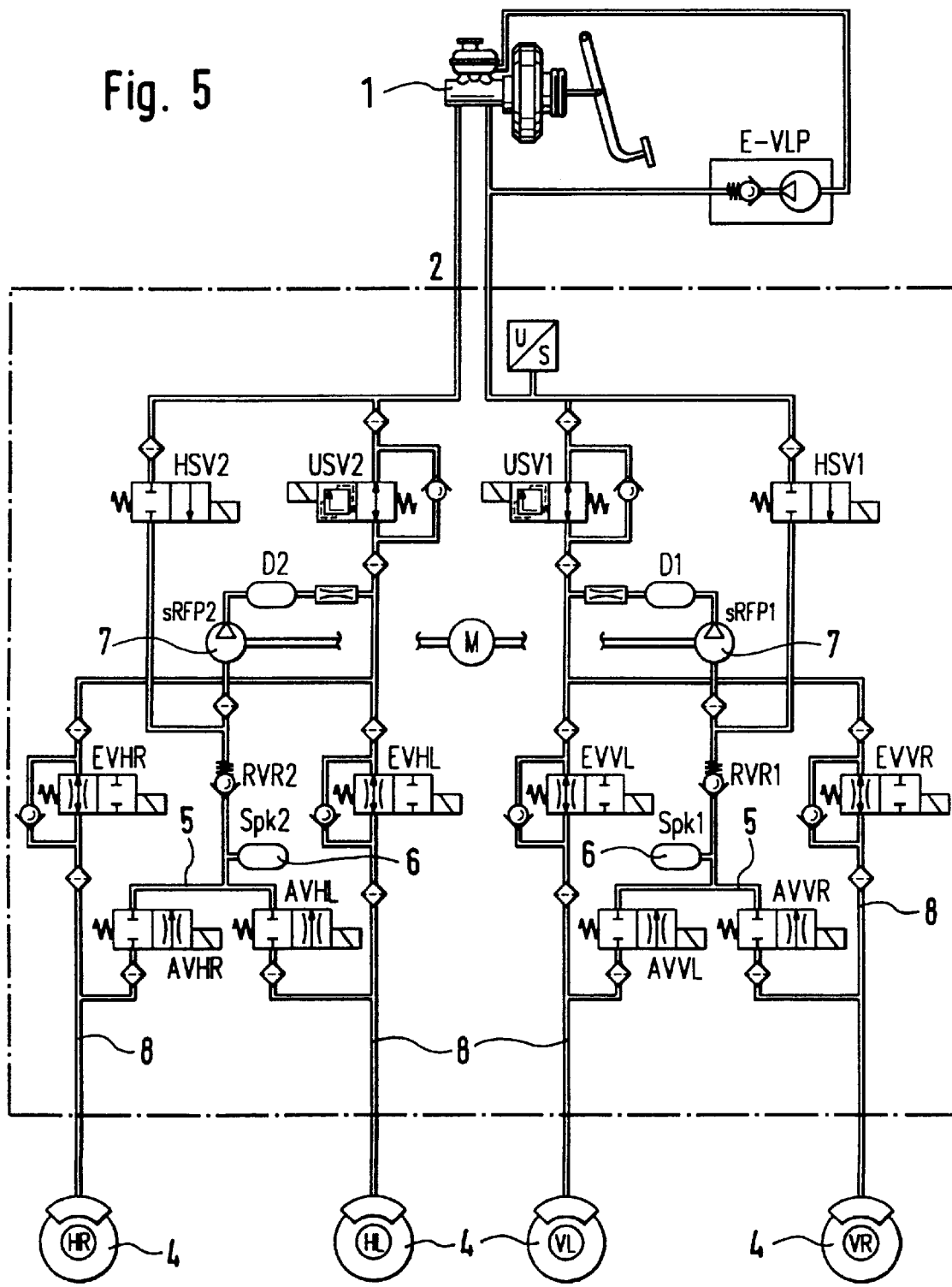
FIG. 5 shows a diagram of an example of a motor vehicle braking system in which the method according to the present invention may be used.

FIG. 5 shows an example of a system in which the method according to the present invention is applied. This system is a motor vehicle braking system suitable for application in association with an antilock control unit, or in general with a driving dynamics control unit. It includes a master brake cylinder 1, from which two high-pressure lines 2 extend via switch-over valves USV1, USV2, which are open in the idle state shown in the figure, to four inlet valves EVHR, EVHL, EVVL, EVVR. The inlet valves are so-called 2/2 solenoid valves; they too are open in the idle state. Brake chambers 4 of the four wheels HR, HL, VL, VR are each connected via line sections 8 to the outlet of the associated inlet valve and to an inlet of an associated outlet valve AVHR, AVHL, AVVL, AVVR. The outlet valves are likewise 2/2 solenoid valves; they are shut in the idle state; their outlets open to two low-pressure lines 5, one for the front wheels of the motor vehicle and one for the rear wheels. Each low-pressure line includes a reservoir chamber 6, and is connected to a feed pump sRFP1, sRFP2 that feeds brake fluid from the low-pressure line into high-pressure line 2.

A control circuit (not shown) individually controls the switched state of each inlet and outlet valve by selective excitation of its electromagnet.

When the brake pedal is actuated by the driver, the pressure in master brake cylinder 1 rises, and consequently, via the open inlet valves, in wheel brake chambers 4 as well. When, with the aid of a connected sensor, the control circuit detects the threat of locking of a wheel, such as wheel HR, it switches the inlet valve EVHR and outlet valve AVHR from their idle state to an active state, in which the inlet valve EVHR shuts and the outlet valve AVHR opens, so that the pressure in wheel brake chamber 4 declines again.

Once the control circuit again detects that the wheel is turning freely due to the declining brake pressure, it again shuts the outlet valve and progressively, by briefly opening the inlet valve, again raises the pressure in the wheel brake chamber, long enough or often enough until the threat of locking is again detected.

With the assistance of the method according to the present invention, the control circuit can now model the pressure increase in the brake cylinders during the brief opening of the inlet valves described above, treating brake cylinder 1 and high-pressure line 2 as the first reservoir and each of wheel brake chambers 4, including the associated line sections 8, as second reservoirs.

Moreover, the method according to the present invention may also be used when the pressure in a wheel brake chamber declines, whereupon wheel brake chamber 4 and the associated line section 8 are treated as the first volume reservoir and low-pressure line system 5 having reservoir chambers 6 is treated as the second reservoir.

What is claimed is:

1. A method for estimating pressure changes within a hydraulic system having a first reservoir and at least one second reservoir connected to the first reservoir via a valve, comprising the steps of:
   (a) specifying a pressure differential between the first and second reservoirs;
   (b) calculating a value of a volume exchanged between the first and second reservoirs via the valve within a specified time interval, the value of the volume exchanged being calculated as a function of a value for the pressure differential that is valid at a start of the specified time interval;
   (c) calculating a value of a volume to be exchanged between the first and second reservoirs in order to achieve equal pressures in the first and second reservoirs;
   (d) if the value of the volume exchanged calculated in step (b) is greater than the value of the volume to be exchanged as calculated in step (c), replacing the value of the volume exchanged with the value of the volume to be exchanged; and
   (e) adopting the replaced value of the volume exchanged as a change in a volume in the second reservoir and determining a pressure change in the first and second reservoirs using the replaced value of the volume exchanged.

2. The method according to claim 1, wherein the pressure change is used to determine a pressure differential prevailing between the first and second reservoirs after the volume exchange, and the steps are repeated for the determined pressure differential.

3. The method according to claim 1, further comprising the steps of; before step (a):
   establishing a first relationship between a pressure of the first reservoir and a volume of the first reservoir, the first relationship being a pV characteristic for determining the volume of the first reservoir; and
   establishing a third relationship between a pressure of the hydraulic system and a volume of the hydraulic system, the third relationship being a pV characteristic for determining the volume of the hydraulic system.

4. The method according to claim 3 further comprising the step of establishing a second relationship for the second reservoir, the second relationship being a pV characteristic for determining a volume of the second reservoir.

5. The method according to claim 4, wherein step© includes the sub-step of determining the volume of the first reservoir after the pressure change using the first relationship, and further comprising the steps of:
   determining a change in the volume of the hydraulic system associated with a change in the volume of the first reservoir;
   determining a pressure corresponding to the changed volume of the hydraulic system using the third relationship; and
   determining the volume to be exchanged from a resulting pressure and at least one of the first and second relationships.

6. The method according to claim 1, wherein Bernoulli's equation is used in step (b).

7. The method according to claim 1, wherein the first reservoir includes a braking circuit in a motor vehicle and the second reservoir includes at least one brake chamber of wheels of the motor vehicle.

8. The method according to claim 1, wherein:
   at least one of pressure changes and volume changes within the hydraulic system
   containing a plurality of second reservoirs connected to the first reservoir via a plurality of valves is estimated,
   steps (b) through (d) are executed for each of the second reservoirs, and
   the pressure change is determined using the replaced values obtained for the second reservoirs in step (d).

9. A device for estimating changes in at least one of a pressure and a volume within a hydraulic brake system, comprising:
   a control unit performing the following steps:
   (a) specifying a pressure differential between the first and second reservoirs;
   (b) calculating a value of a volume exchanged between a first reservoir and at least one second reservoir via the valve within a specified time interval, the value of the volume exchanged being calculated as a function of a value for the pressure differential that is valid at a start of the specified time interval;
   (c) calculating a value of a volume to be exchanged between the first reservoir and the at least one second reservoirs in order to achieve equal pressures in the first reservoir and the at least one second reservoir;
   (d) if the value of the volume exchanged calculated in step (b) is greater than the value of the volume to be exchanged as calculated in step (c), replacing the value of the volume exchanged with the value of the volume to be exchanged; and
   (e) adopting the replaced value of the volume exchanged as a change in a volume in the at least one second reservoir and determining a pressure change in the first reservoir and the at least one second reservoir using the replaced value of the volume exchanged.

* * * * *